United States Patent [19]

Bretl

[11] 4,331,971
[45] May 25, 1982

[54] MODE DECISION CONTROLLER FOR SELECTIVELY ACTUATING A CHROMINANCE BANDWITH ENHANCEMENT IN A TELEVISION RECEIVER

[75] Inventor: Wayne E. Bretl, Schaumburg, Ill.

[73] Assignee: Zenith Radio Corporation, Glenview, Ill.

[21] Appl. No.: 208,211

[22] Filed: Nov. 19, 1980

[51] Int. Cl.³ .......................................... H04N 9/535
[52] U.S. Cl. ..................................................... 358/37
[58] Field of Search ....................... 358/37, 38, 39, 40, 358/166

[56] References Cited

U.S. PATENT DOCUMENTS

4,245,239 1/1981 Richman ............................... 358/37

Primary Examiner—Robert L. Richardson
Attorney, Agent, or Firm—Jack Kail

[57] ABSTRACT

A mode decision controller is described for actuating a conventional chrominance bandwith enhancement scheme in a color television receiver. A video signal detected by the receiver typically includes a relatively wide band luminance element and a relatively narrow band chrominance element, each of which are processed by the enhancement scheme to develop their first derivatives for use in enhancing the bandwith of the chrominance element. Either of these derivatives may be used as an input to the mode decision controller. The selected derivative is applied to a filter for removing components therefrom which extend above a given frequency range, thereby developing a frequency-limited output signal whose time domain exceeds the time domain of the selected first derivative. A signal processor receives the frequency-limited output signal and compresses its time domain to develop a control signal whose time domain is substantially equivalent to the time domain of the selected first derivative. The control signal is then used to activate the enhancement scheme.

10 Claims, 9 Drawing Figures

MODE DECISION CONTROLLER FOR SELECTIVELY ACTUATING A CHROMINANCE BANDWITH ENHANCEMENT IN A TELEVISION RECEIVER

BACKGROUND OF THE INVENTION

The present invention is generally directed to improvements in color television receivers. It is particularly directed to receiver processing systems which enhance the bandwidth of detected color-difference signals in response to certain luminance transitions.

Broadcast television signals are conventionally derived from wide band R (red), B (blue) and G (green) primary signals. The primary signals are combined so as to develop a wideband Y (luminance) signal. In addition, the primary signals are stripped of some of their high frequency components to develop narrower bandwidth chrominance or color-difference signals, R-Y, B-Y and G-Y. The latter signals are normally transmitted as quadrature amplitude modulated I and Q signals along with the Y signal. Generally, the I signal has a greater bandwidth than the Q signal.

At the receiver, the Y signal is detected and applied to a CRT (cathode ray tube) to develop a wide bandwidth black and white image. The color components of the image are usually developed by treating the I and Q signals equally. This is, both are detected and processed as though they had equally narrow bandwidths, and are applied to the CRT so as to combine with the Y signal thereat.

Although the above-described signal processing technique generates commercially acceptable images, it is known that visible image errors are developed. For example, combining each color-difference signal with equal proportions of the Y signal at the receiver effectively attributes to each color-difference signal an equal portion of the high frequency Y components. In the general case, the primary colors do not contribute equally in the development of the high frequency Y components as the television signal is normally developed. Hence, attributing to them equal high frequency Y components at the receiver produces noticeable errors in the reproduced television image.

To overcome the problem described above, it has been proposed that, under certain conditions, each of the three color-difference signals detected in the receiver be modified so as to include its own unique, controllable portion and polarity of the high frequency components of the Y signal. U.S. Pat. No. 4,181,917 discloses that this may be accomplished by inferring that the high frequency components of the Y signal should be included in each color-difference signal according to the ratio which the derivative of each color-difference signal's low frequency components bears to the derivative of the Y signal's low frequency components. Thus, each color-difference signal is combined with a different amount and the appropriate polarity of "inferred highs" contained in the Y signal. This process is referred to herein as "chrominance bandwidth enhancement."

It has been proposed that such chrominance bandwidth enhancement be effected only under certain circumstances, such as when the derivative of the Y signal exceeds a predetermined amplitude. When the Y signal reflects a luminance step or impulse, the derivative of the Y signal is usually large, wherefore a decision is made to implement bandwidth enhancement. A problem with such a decision process is that it assumes that the enhancement scheme is able to accurately determine the ratio which the derivative of the low frequency color-difference components bears to the derivative of the low frequency Y components. Since both derivatives approach zero near the edges of a luminance transition, it is very difficult to obtain an accurate ratio determination at those times.

A particularly troublesome transition is an isolated impulse. Because the derivative of such a transition goes to zero near the center of the transition, and because the amplitude of that derivative is used to decide whether to activate the bandwidth enhancement scheme, the enhancement may be turned on, turned off when the derivative goes to zero, and then turned on again as the amplitude of the derivative increases. Consequently, the decision as to when to activate the enhancement scheme is subject to error.

For the reasons stated above, prior chrominance bandwidth enhancement systems have introduced certain errors in the television image while attempting to correct other errors. Consequently, commercial television receivers have not adopted such enhancement schemes. The present invention substantially eliminates the errors in the decision as to when to activate chrominance bandwidth enhancement, thereby rendering such a scheme more commercially viable.

OBJECTS OF THE INVENTION

It is a general object of the invention to provide an improved decision making system for determining when to activate chrominance bandwidth enhancement in a television receiver.

It is a more specific object of the invention to provide such a system which substantially eliminates those errors in chrominance bandwidth enhancement which occur at luminance transition edges, and to eliminate errors which occur in response to an isolated luminance impulse.

BRIEF DESCRIPTION OF THE FIGURES

The objects stated above and other objects of the invention are set forth more particularly in the following detailed description and in the accompanying drawings, of which.

DESCRIPTION OF THE PREFERRED EMBODIMENT

Figures 1, 2, 3:
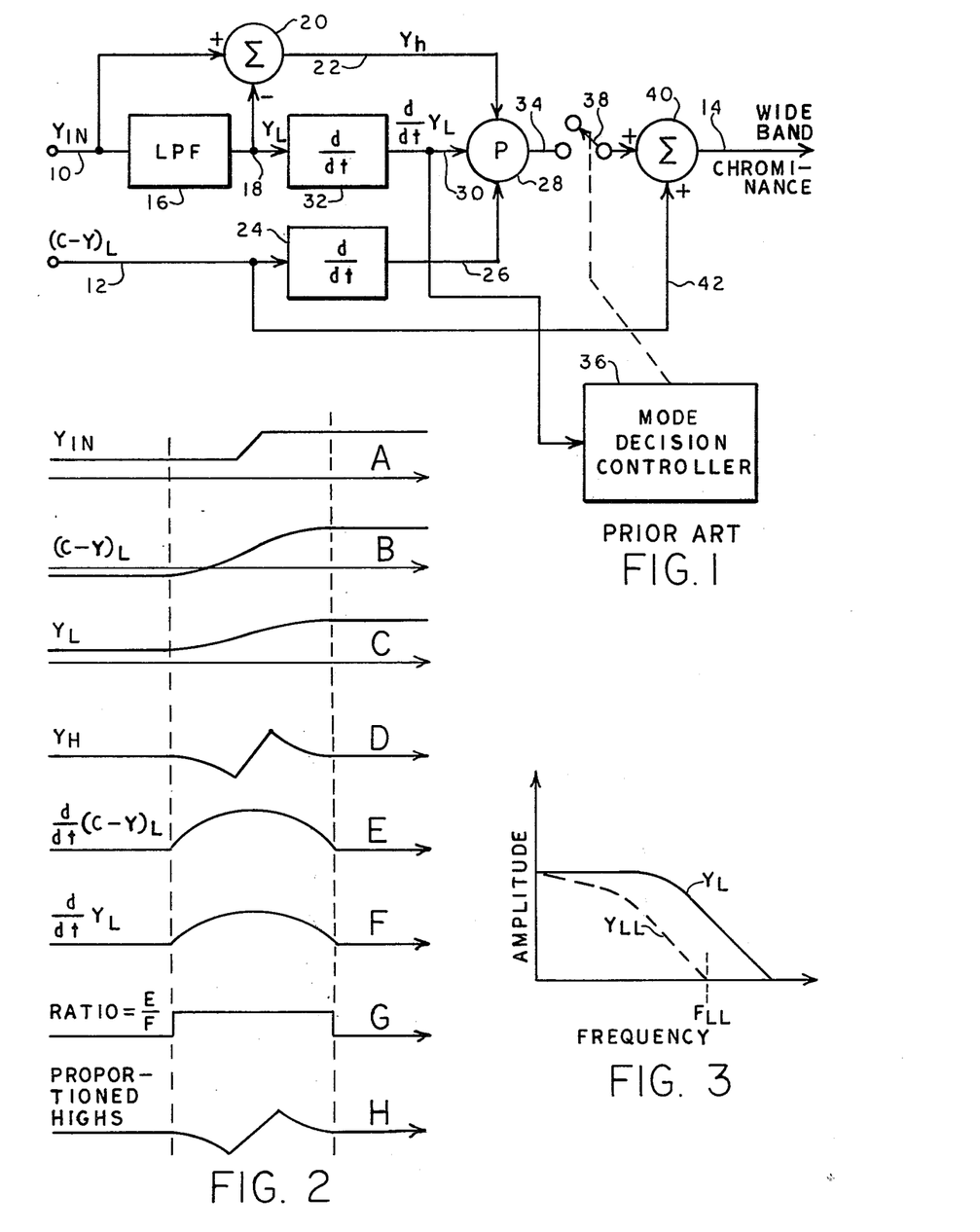
FIG. 1 shows a conventional bandwidth enhancement system including a conventional mode decision controller.
FIG. 2 illustrates various waveforms useful in describing the operation of the system shown in FIG. 1.
FIGS. 3, 4 and 5 depict waveforms useful in describing certain problems associated with a conventional mode decision controller.

Referring now to FIG. 1, a conventional chrominance bandwidth enhancement system is shown of the type disclosed in U.S. Pat. No. 4,181,917. A general description of the operation of this system is given below in order to illustrate the improvement which the present invention provides. It should be understood, however, that the present invention is not limited in its use to this specific enhancement system.

The illustrated system receives two inputs, one identified as Yin at lead 10 and another input indicated as $(C-Y)_L$ at another lead 12. The input at lead 10 may be a conventionally detected, wideband luminance signal. The input at lead 12 is a detected color-difference signal (R-Y, B-Y or G-Y) whose bandwidth is normally 500 kilohertz or less. As described in more detail below, selected high frequency components of the input luminance signal (Yin) are added to the input color-difference signal in order to provide a wideband chrominance signal at the system's output lead 14.

The luminance signal Yin is coupled to a low pass filter 16 for developing an output at node 18 ($Y_L$) whose bandwidth is substantially equivalent to the bandwidth of the input color-difference signal at lead 12. The filtered signal $Y_L$ is then applied to a subtractor 20 whose other input is the wideband luminance signal from input lead 10. Hence, the output of the subtractor 20 at lead 22 comprises the high frequency components $Y_h$ of the input luminance signal.

Referring briefly to FIG. 2, waveform A thereof depicts a step transition in the input luminance signal. Waveform C shows the resultant low passed luminance signal $Y_L$, and waveform D illustrates the high frequency output $Y_h$ of the subtractor 20. In many cases the input color-difference signal will experience an amplitude transition at the same time the luminance signal undergoes such a transition. Waveform B illustrates the amplitude transition in the input color-difference signal at lead 12.

Referring again to FIG. 1, the color-difference input signal at lead 12 is applied to a derivative network 24 for developing a signal on its output lead 26 which represents the first derivative of the input color-difference signal. Waveform E of FIG. 2 generally illustrates the type of signal developed on lead 26 in response to the amplitude transition associated with the input color-difference signal.

A proportioning network 28 receives the color derivative signal on the lead 26, the high frequency luminance components $Y_h$ on lead 22, and a signal representing the first derivative of the low passed luminance signal on another lead 30. The latter signal is supplied by a derivative network 32 which receives the low passed luminance signal at node 18 and takes the first derivative of that signal. For the luminance transition illustrated in FIG. 2, the resultant signal on the lead 30 is depicted by waveform F.

The function of the proportioning network 28 is twofold: to determine the ratio which the color derivative signal on the lead 26 bears to the luminance derivative signal on the lead 30, and then to multiply the value of the resultant ratio times the high frequency luminance signal on the lead 22. For the example illustrated in FIG. 2, waveform G illustrates the ratio developed by the proportioning network 28. Proportioning network 28 then multiplies that ratio times the high frequency luminance signal $Y_h$ (waveform D) to develop at its output lead 34 a signal (waveform H) referred to herein as "proportioned highs."

The proportioned highs present on the lead 34 is that which is to be combined with the input color-difference signal at lead 12 in order to develop a wide band chrominance signal at the output lead 14. To determine whether such a combination should be made, a mode decision controller 36 is included. This device senses the derivative of the low passed luminance signal on lead 30 for closing a switch 38 when that luminance signal exceeds a predetermined amplitude. With the switch 38 closed, the proportioned highs on lead 34 are coupled to an adder 40 which receives the input color-difference signal via another lead 42. In this manner, a wideband chrominance signal is developed at the output lead 14.

When the mode decision controller 36 senses that the signal at lead 30 is below the predetermined threshold, the switch 38 is held open, wherefore no bandwidth enhancement is effected.

One of the problems associated with the system illustrated in FIG. 1 has to do with the manner in which a decision is made for opening and closing the switch 38. For example, repetitive amplitude transitions which develop frequencies within the pass band of the filter 16 may be of a very low amplitude but large enough to cause the signal on lead 30 to activate the controller 36. The derivative of the input color-difference signal (at lead 26) will also have very small amplitudes under the same conditions. Consequently, it is difficult for the proportioning network 28 to develop an accurate ratio of those small amplitude signals. The proportioned highs at lead 34 may, therefore, be incorrect.

To alleviate this problem the bandwidth of the signal which the mode decision controller 36 relies on to make its decision may be reduced so as to eliminate frequencies at or above which the proportioning network 28 is unable to develop an accurate ratio. For example, FIG. 3 illustrates the bandwidth of the signal $Y_L$ whose derivative the mode decision controller 36 normally receives. The problem discussed above can be alleviated by reducing the bandwidth of the signal $Y_L$ to a lower frequency signal $Y_{LL}$ whose upper frequency is $F_{LL}$. Hence, for any frequencies above $F_{LL}$, the input to the controller 36 is too small to result in closure of the switch 38. At frequencies below $F_{LL}$, the decision controller 36 may close the switch 38 to provide chrominance bandwidth enhancement.

Figure 4:
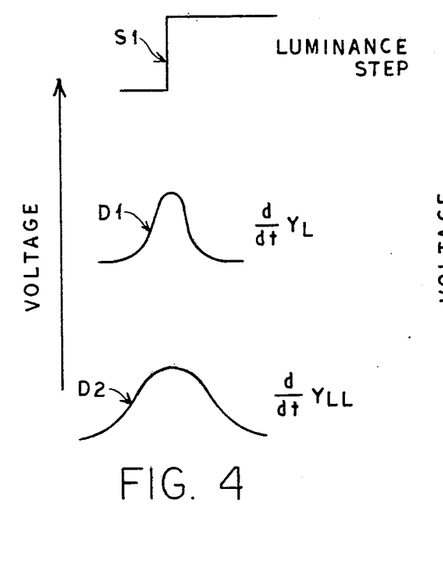

Although reducing the bandwidth of the decision signal from $Y_L$ to $Y_{LL}$ alleviates one aspect of the problem discussed above, it introduces yet another problem. To illustrate the problem which occurs as a result of reducing the bandwidth of the decision signal, reference is made to FIG. 4. As shown, a decision signal D1 corresponding to the first derivative of the low passed luminance signal is developed in response to a luminance step S1. This derivative signal is, as described above, normally input to the controller 36 for rendering a decision as to whether to effect bandwidth enhancement. If, however, the bandwidth of the luminance signal is reduced to $Y_{LL}$ (as in FIG. 3), the time domain of the decision signal is increased, as shown by the waveform D2 which represents the derivative of $Y_{LL}$. As shown, the pulse width of the latter signal is wider than the pulse which corresponds to the derivative of $Y_L$. This will cause bandwidth enhancement to occur during a time period which is too wide.

Figure 5:
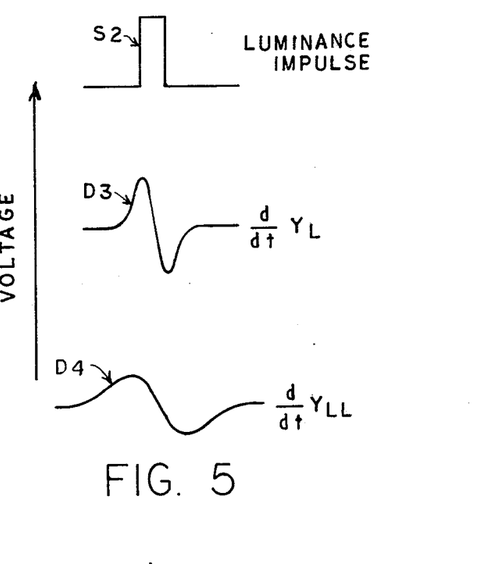

As mentioned previously, conventional bandwidth enhancement systems also suffer problems when isolated luminance impulses are received. As shown in FIG. 5, a luminance impulse S2 gives rise to a decision signal D3 which corresponds to the first derivative of $Y_L$. The latter derivative crosses through zero approximately at the center of the luminance impulse. Because of the zero crossing, the decision controller 36 is unable to properly determine when bandwidth enhancement is to be effected. Reducing the bandwidth of the luminance signal $Y_L$ to $Y_{LL}$ does not solve this problem. As shown, the derivative D4 of the lower frequency luminance signal $Y_{LL}$ also crosses through zero. Hence, no improvement occurs in the ability of the decision controller to accurately determine when bandwidth enhancement is to be effected when a luminance impulse occurs.

Figure 6:
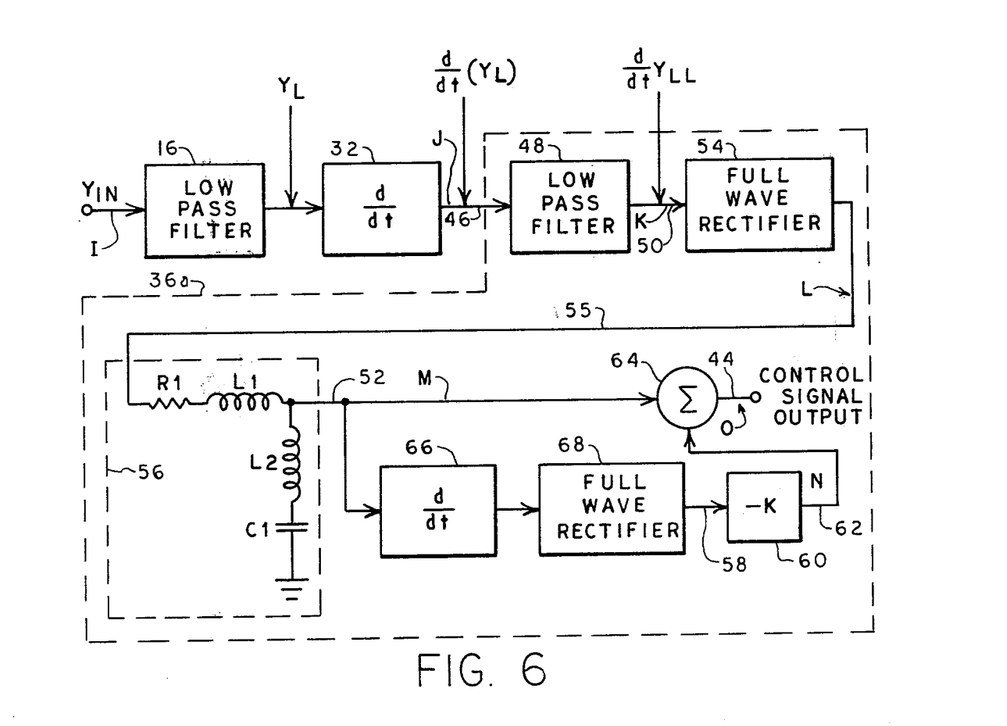
FIG. 6 shows a mode decision controller in accordance with the invention, in addition to a low pass filter and derivative network whose outputs may drive the controller.

To overcome the foregoing problems, the invention provides an improved mode decision controller for activating a chrominance enhancement scheme such as the one shown in FIG. 1. Referring to FIG. 6, the present decision controller 36a is shown for developing, at an output terminal 44, a control signal which may be applied to the switch 38 (FIG. 1) for implementing chrominance bandwidth enhancement at appropriate times. The input to the controller 36a is at a lead 46 which carries the derivative of the low pass filtered luminance signal. The latter signal may be developed in the same manner as shown in FIG. 1, as by coupling the input luminance signal through low pass filter 16 to obtain the signal $Y_L$, and then taking the derivative of the latter signal by the network 32. When the luminance input signal is in the form of a step as shown by Waveform I of FIG. 7, the signal developed on the lead 46 is as shown by waveform J of FIG. 7. The other waveforms of FIG. 7 occur at correspondingly designated leads in the controller 36a. Another set of waveforms designed I' through O' are shown in FIG. 8. These latter waveforms indicate the system's response to a rectangular impulse I' and appear at the same leads on which the correspondingly non-primed waveforms of FIG. 7 appear.

The first element in the controller 36a is a low pass filter 48 which receives the first derivative of the low pass luminance signal on lead 46 and removes frequency components therefrom which extend above a selected frequency range, thereby to develop at its output 50 a frequency limited signal whose time domain exceeds the time domain of the signal on the lead 46. Waveforms K and K' in FIGS. 7 and 8, respectively, indicate the nature of the signal at the output 50.

As stated previously, frequencies which constitute to small amplitude components in the derivative of the low pass luminance signal can contribute to errors in the generation of the ratio which the proportioning network 28 (FIG. 1) develops. Accordingly, the pass band of the low pass filter 48 is selected to eliminate from its output those frequencies which contribute to relatively small amplitude components in the signals used by the proportioning network 28. In addition, the characteristics of the filter 48 are selected such that the characteristics of the filter 16 and the filter 48 together have a cosine-squared response to an impulse in the video signal.

Figure 7:
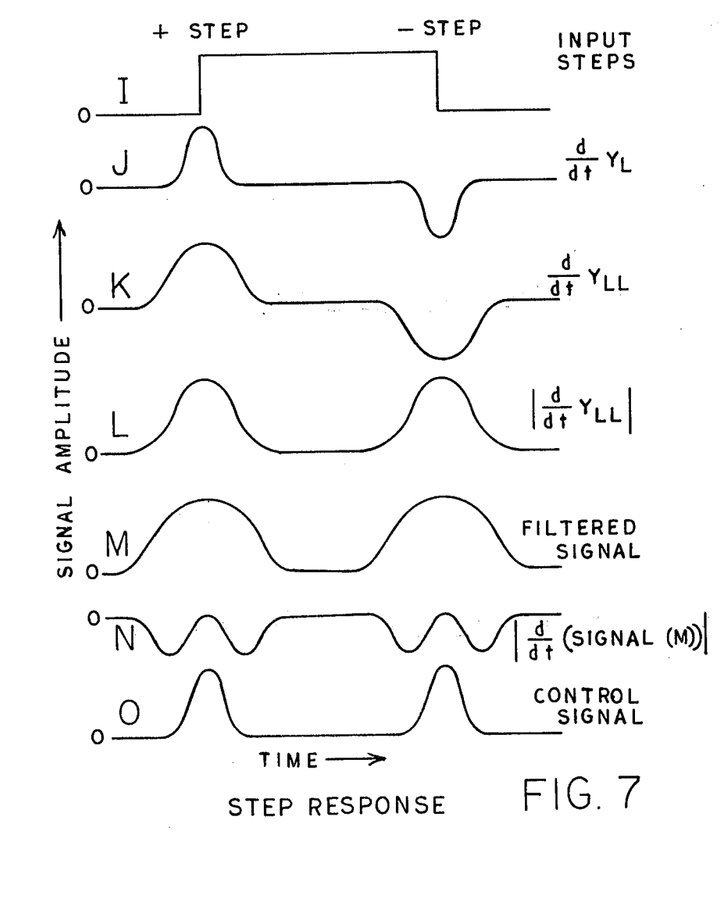
FIG. 7 depicts waveforms which appear at designated points in FIG. 6 in response to a luminance step.
Figure 8:
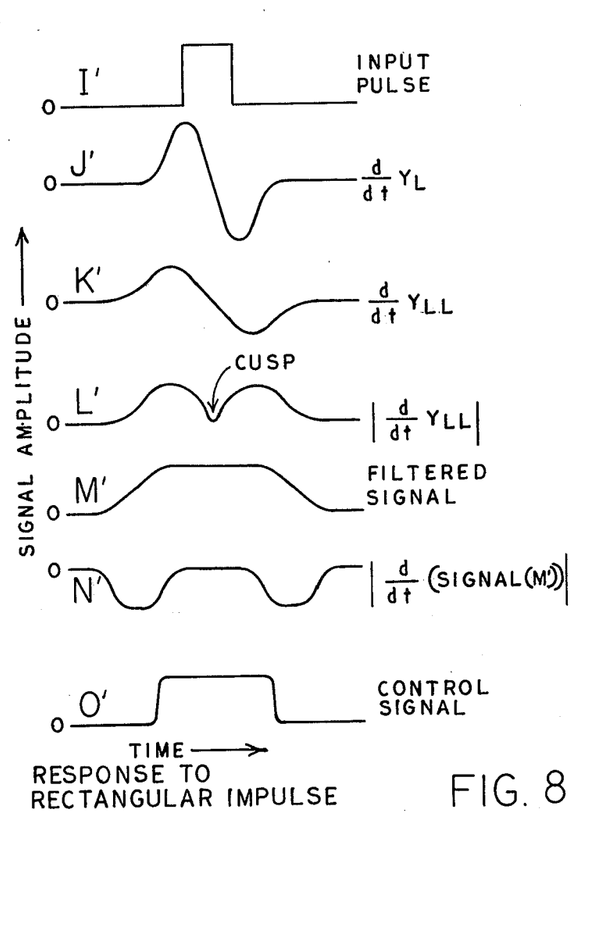
FIG. 8 depicts waveforms which appear at the same designated points in FIG. 6 in response to a rectangular luminance impulse.

Referring briefly to FIGS. 7 and 8, it can be seen that the waveforms K and K' developed by the low pass filter 48 have time domains which are greater than those associated with the signals J and J'. The remainder of the controller 36a operates to receive the frequency-limited output signal of the filter 50 for compressing its time domain so as to develop a control signal whose time domain is substantially equivalent to the time domain of the derivatives shown by waveforms J and J'.

The first step in achieving this objective is to convert the signal on lead 50 (referred to below as signal S1) to a first intermediate signal comprising the sum of: (a) signal S2 corresponding to a low pass filtered version of the absolute value of the signal S1, and (b) a portion of the second derivative of the signal S2. Such a first intermediate signal is developed on a lead 52 by the combined operation of a full wave rectifier 54 and a filter 56. The rectifier 54 rectifies the signal at lead 50 to develop a unipolar output signal on lead 55. Waveforms L and L' of FIGS. 7 and 8 illustrate the operation of the rectifier 54. The filter 56 develops a low pass-filtered version of the rectified signal on the lead 55 to develop the signal S2, takes the second derivative of the signal S2, and then sums the signal S2 with a portion of the second derivative thereof. The net result of the above-described operation is a first intermediate signal on the lead 52, the waveform of which is shown as M in FIG. 6 and as M' in FIG. 7.

The illustrated embodiment of the filter 56 includes a resistor R1 in series with coil L1, the other end of the coil L1 being coupled to ground through a coil L2 and a capacitor C1. The output of the filter 56 consists of the sum of the voltages on C1 and L2. The voltage on C1 corresponds to the signal S2 mentioned above and is a slightly low-passed version of the signal on lead 55. The voltage across L2 is a portion of the second derivative of the voltage on C2. Referring to the waveform L' in FIG. 8, it will be observed that the cusp present in the waveform L' due to the impulse has been removed by the operation of the filter 56.

As explained above, the signal S2 is summed with a portion of its second derivative. That portion is preferably selected so that the cusp shown in waveform L' of FIG. 8 is just removed, and is effected by selecting the appropriate ratio of L2 to the sum of L1 plus L2.

The time domain of the waveform M' (or M) is still too wide to be used by the controller 36a, wherefore the first intermediate signal on the lead 52 is processed to develop a second intermediate signal on a lead 58. The latter signal corresponds to the absolute value of the first derivative of the first intermediate signal on lead 52, and is coupled via a network 60 and a lead 62 to one input of a summer 64. The other input to the summer 64 is the first intermediate signal on the lead 52. With this arrangement, the summer 64 combines the first and second intermediate signals to develop the control signal output at lead 44.

Specifically, the signal on lead 52 is coupled to a network 66 which takes the first derivative of the signal on the lead 52. The output of the network 66 is coupled to a full wave rectifier 68 whose output lead 58 carries a unipolar version of the input signal to the rectifier 68. The signal on lead 58 is coupled to the network 60 which may amplify or attenuate the signal on the lead 58 by a constant negative factor K. The value of the factor K controls the width and steepness of signal edges at the output of the summer 64. Typically, the value of K is selected such that the peak amplitude of the signal on lead 52 is four times greater than the peak amplitude of the signal on lead 62.

The output of the network 60, waveform N, is coupled to one input of the summer 64. By adding its two inputs together, the summer 64 develops a control signal output on lead 44 such as shown by waveforms O and O' in FIGS. 7 and 8.

Comparing waveforms O and J of FIG. 7, it can be seen that the time domain of the waveform O is substantially the same as the time domain of the waveform J, the latter of which is used as the decision signal in the conventional enhancement scheme. Hence, the time at which enhancement occurs in the present embodiment, and the duration thereof, is substantially the same as that developed in the conventional enhancement system utilizing waveform J. However, because high frequency components have been removed from the signal which corresponds to waveform J by the low pass filter 48, the control signal waveform O is not developed in response to those higher frequencies which cause the proportioning network 28 to develop an unreliable or uncertain ratio. Hence, bandwidth enhancement occurs with the present invention only when the proportioning network 38 is capable of developing a reliable and useful ratio.

Referring now to FIG. 8, it can be seen that the width of the time domain associated with waveform O' is substantially the same as the width of the time domain associated with waveform J'. Moreover, the waveform O' does not include the zero crossing which the waveform J' does. Hence, the present mode decision controller is able to activate bandwidth enhancement at the proper times, even in response to an isolated rectangular impulse.

Figure 9:
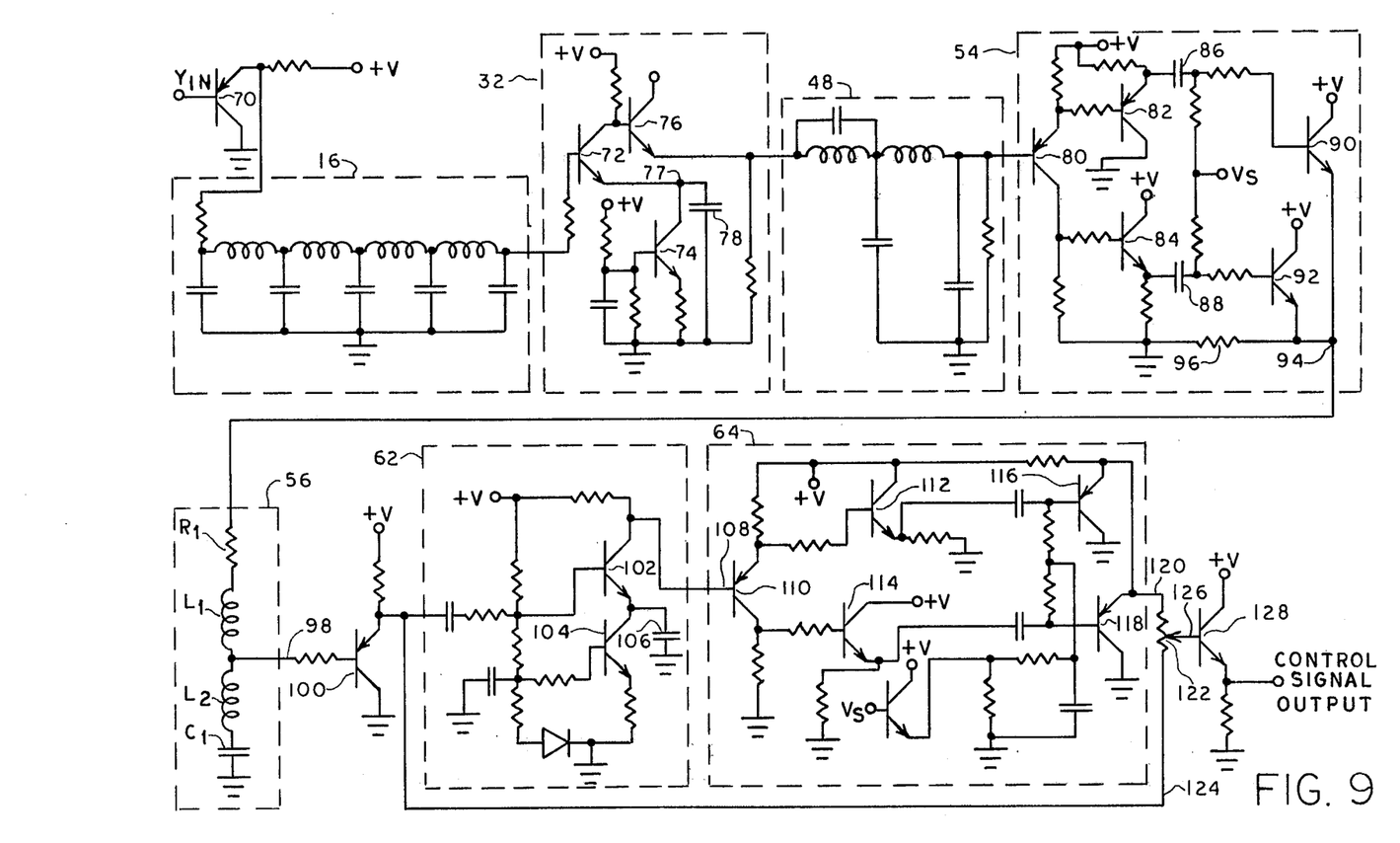
FIG. 9 is a detailed circuit diagram of the components shown in FIG. 6.

Referring now to FIG. 9, a preferred embodiment is illustrated of the low pass filter 16, the derivative network 32, and the elements which constitute the decision controller 36a of FIG. 5. The luminance input signal Yin is received at the base of a transistor 70 which operates as an emitter follower. The output of the transistor 70 is coupled to the illustrated low pass filter 16. The filter 16 is constructed of resistors, capacitors and coils in the manner illustrated, the values of those components being selected such that the characteristics of the filter 16 and the low pass filter 48 produce a cosine-squared impulse response, a frequency response having a zero at 360 kilohertz and an amplitude response which is 6 db down at 180 kilohertz.

The output of filter 16 is coupled to the derivative network 32 which includes transistors 72 and 74 and an emitter follower transistor 76. The collector of transistor 74 is coupled to the emitter of the transistor 72 at a node 77 so that the transistor 74 serves as a current source to the transistor 72. Coupled between ground and the node 77 is a capacitor 78. The current through the capacitor 78 is proportional to the derivative of the voltage across it, wherefore the transistor 72 develops a collector voltage which corresponds to the derivative of the AC component of the current carried by the transistor 72. That collector voltage is coupled through the transistor 76 to the input of the low pass filter 48.

The filter 48 may be of the type shown or of any other conventional construction. Suffice it to say that the filter 48 is selected such that its characteristics, in combination with the characteristics of filter 16, produce the response stated above.

The full wave rectifier 54 includes a transistor 80 which acts as a phase splitter. That is, the emitter and collector of the transistor 80 carry opposite phase signals which are coupled to the bases of emitter follower transistors 82 and 84. The opposite phase signals appearing at the emitters of transistors 82 and 84 are coupled via capacitors 86 and 88 to the bases of additional transistors 90 and 92. The emitters of the latter transistors are coupled together at a node 94 and to ground via an emitter load resistor 96. With the illustrated arrangement, the transistors 90 and 92 have equal DC biases so that the transistor 90 conducts on positive-going signal excursions at its base to develop a corresponding positive-going signal across the resistor 96. During the conduction of the transistor 90, the transistor 92 is off. Negative-going excursion of the signal at the base of the transistor 90 turn that transistor off. However, an opposite phase signal is present on the base of the transistor 92, wherefore the latter transistor conducts to develop another positive-going signal across the emitter resistor 96. Hence, all signals received at the base of the transistor 80 appear fully rectified at the node 94.

Receiving the rectified signal from the node 94 is the previously described filter 56 which includes the resistor R1, coils L1 and L2 and a capacitor C1. The filtering effect previously described may be effected by selecting, for example, the resistor R1 to have a value of 1,000 ohms, the coil L1 to have a value of 270 microhenries, the coil L2 to have a value of 120 microhenries, and the capacitor C1 to have a value of 1,000 picofarads.

At the junction between the coils L1 and L2, a lead 98 carries the filtered signal to the base of a buffer transistor 100. The emitter of this transistor is coupled to the derivative network 62 which includes transistors 102 and 104, a capacitor 106 and the illustrated resistive biasing network. Suffice it to say that the network 62 operates similarly to the network 32 for developing an output on lead 108 which corresponds to the first derivative of the signal which appears at the emitter of the transistor 100.

The lead 108 is coupled to the input of the full wave rectifier 64 which includes a phase splitting transistor 110 coupled to the bases of buffer transistors 112 and 114. The emitters of the latter transistors are AC coupled to the bases of transistors 116 and 118, the emitters of which are tied together at a node 120. The illustrated arrangement of the rectifier 64 operates similarly to the rectifier 54, the main difference between the two being that transistors 116 and 118 are of the PNP type whereas transistors 90 and 92 are of the NPN type. Hence, negative-going rectified signals are developed at the node 120.

The signal from the rectifier 64 is combined with the output of the filter 66 by coupling the node 120 to one end of a resistor 122 and the emitter of the transistor 100 to the other end of that resistor via a lead 124. A wiper arm 126 selects a given proportion (K) of the signal at node 120 for combination with the signal on the lead 124 and applies that combination to the base of an output transistor 128. Thus, a control signal output is developed at the emitter of transistor 128 for actuating the chrominance bandwidth enhancement.

The embodiments of FIGS. 6 and 9, as previously described, receive the luminance signal Yin, filter it, and take its derivative. The derivative supplies the input to the mode decision controller 36a. Alternately, the input to the mode decision controller may be derived from the color-difference input $(C-Y)_L$ which appears on lead 12 of FIG. 1. Because the signal $(C-Y)_L$ is already a relatively narrow band signal, the low pass filter 16 (FIG. 6) may be eliminated and the derivative network 24 (FIG. 1) may replace the derivative network 32 in FIGS. 6 and 9. The components which make up the mode decision controller may be as shown.

Although the invention has been described in terms of a preferred embodiment, it will be obvious to those skilled in the art that many modifications and alterations thereto may be made without departing from the invention. Accordingly, it is intended that all such modifications and alterations be considered as within the spirit and scope of the invention as defined by the appended claims.

What is claimed is:

1. In a television receiver which detects a video signal having a relatively wideband luminance element and a relatively narrow band chrominance element, and which develops a first derivative of the low frequency components of at least a selected one of the luminance and chrominance elements for implementing a chrominance bandwidth enhancement scheme, a mode decision controller for selectively activating the enhancement scheme, comprising:
   filter means receiving the first derivative for removing components therefrom which extend above a selected frequence range, thereby developing a frequency-limited output signal whose time domain exceeds the time domain of the first derivative;
   signal processing means receiving the frequency limited output signal for compressing its time domain so as to develop a control signal whose time domain is substantially equivalent to the time domain of said first derivative; and
   means responsive to said control signal for activating the enhancement scheme.

2. A mode decision controller as set forth in claim 1 wherein the chrominance bandwidth enhancement scheme adds high frequency components of the luminance element to the chrominance element as a function of the ratio which the derivative of the chrominance element's low frequency components bears to the derivative of the luminance element's low frequency components, and wherein said selected frequency range is chosen to eliminate, from the frequency limited output signal, frequencies which contribute to relatively small amplitude components in the above-stated ratio.

3. A mode decision controller as set forth in claim 2 wherein said filter means comprises a low pass filter.

4. A mode decision controller as set forth in claim 3 wherein said low pass filter is selected such that its output corresponds to a cosine-squared response to an impulse in the video signal.

5. A mode decision controller as set forth in claim 1 wherein said signal processing means includes:
   first means for converting the frequency-limited output signal (S1) to a first-intermediate signal corresponding to the sum of:
      (a) a signal (S2) corresponding to a low pass-filtered version of the absolute value of the signal (S1), and
      (b) a portion of the second derivative of the signal S2;
   second means receiving said first intermediate signal for developing therefrom a second intermediate signal corresponding to the absolute value of the first derivative of of the first intermediate signal; and
   third means for combining said first and second intermediate signals to develop the control signal.

6. A mode decision controller as set forth in claim 5 wherein said first means includes a full wave rectifier coupled in series with a filter, said filter being selected to provide a low pass filtering function, a second derivative of the low pass filtering function, and an output comprising the sum of said functions.

7. A mode decision controller as set forth in claim 5 wherein said second means includes the serial combination of a full wave rectifier and a first derivative network.

8. In a television receiver which detects a video signal having a relatively wideband luminance element and a relatively narrow band chrominance element, and which includes a chrominance bandwidth enhancement scheme for adding high frequency components of the luminance element to the chrominance element as a function of the ratio which the first derivative of the chrominance element's low frequency components bears to the first derivative of the chrominance element's low frequency components, a mode decision controller for selectively activating the enhancement scheme, comprising:
   a low pass filter receiving a selected one of the first derivatives for removing therefrom components whose frequencies contribute to relatively small amplitude components in the above-stated ratio, thereby developing a frequency-limited output signal (S1) whose time domain exceeds the time domain of the selected first derivative;
   means for converting the signal (S1) to a first intermediate signal corresponding to the sum of:
      (a) a signal (S2) corresponding to a low pass-filtered version of the absolute value of the signal (S1), and
      (b) a portion of the second derivative of the signal (S2);
   means receiving said first intermediate signal for developing therefrom a second intermediate signal corresponding to the absolute value of the first derivative of the first intermediate signal;
   means for substracting a selected fraction of said second intermediate signal from said first intermediate signal to develop a control signal; and
   means responsive to said control signal for activating the enhancement scheme.

9. A mode decision controller as set forth in claim 8 wherein the first derivative of the luminance element's low frequency components is input to said low pass filter.

10. In a television receiver which detects a video signal having a relatively wideband luminance element and a relatively narrow band chrominance element, and which develops a first derivative of the low frequency components of at least a selected one of the luminance and chrominance elements for implementing a chrominance bandwidth enhancement scheme, a mode decision controller for selectively activating the enhancement scheme, comprising:
   means for filtering the first derivative to develop a filtered output from which components above a selected frequency are substantially removed;
   a full wave rectifier receiving the output of said filtering means for developing a unipolar output signal;
   a filter receiving said unipolar output signal for conversion thereof to a first intermediate signal corresponding to the sum of:
      (a) a signal (S2) corresponding to a low pass-filtered version of the unipolar output signal and
      (b) a portion of the second derivative of the signal (S2);

a network coupled to the output of said filter for developing a further signal corresponding to the first derivative of the first intermediate signal;

a second full wave rectifier coupled to the output of said network for developing a second intermediate signal;

means for combining said first and second intermediate signals to develop a control signal; and means responsive to the control signal for activating the enhancement scheme.

* * * * *